July 6, 1943.   E. C. NEAL   2,323,837
MAGNETIC APPARATUS
Filed Feb. 6, 1941   3 Sheets-Sheet 1

INVENTOR.
Ernest C. Neal
BY Spencer, Marzall, Johnston & Cook.
Attys.

July 6, 1943.  E. C. NEAL  2,323,837
MAGNETIC APPARATUS
Filed Feb. 6, 1941  3 Sheets-Sheet 2

INVENTOR.
Ernest C. Neal
BY Spencer, Marzall, Johnston & Cook
Att'ys.

July 6, 1943.  E. C. NEAL  2,323,837
MAGNETIC APPARATUS
Filed Feb. 6, 1941  3 Sheets-Sheet 3

INVENTOR.
Ernest C. Neal
BY Spencer, Marzall, Johnston & Cook
Attys.

Patented July 6, 1943

2,323,837

UNITED STATES PATENT OFFICE 2,323,837

MAGNETIC APPARATUS

Ernest C. Neal, Chicago, Ill., assignor, by direct and mesne assignments, to John A. Marzall, Chicago, Ill., as trustee Application February 6, 1941, Serial No. 377,685

19 Claims. (Cl. 35—46)

This invention has to do with magnetic apparatus of the character wherein a subject is suspended in space by means of a magnetic field, and more particularly it relates to apparatus suitable to so suspend the subject for display or advertising purposes.

An object of the present invention is the provision of a new magnetic means of ring-like formation having a flux field relatively large in diameter for the amount of material used in its construction and thus improving the stability with which the field can suspend an article or subject.

Another object is the provision of a novel arrangement of magnetic means respectively upon a to be suspended subject and upon a supporting base, the latter being the greater in transverse area whereby its magnetic field will partially envelop the field of the former to improve the stability of suspension.

Another object of this invention is the provision of complemental sets of permanently magnetized studs or bars arranged upon a supporting base and a suspended subject and in which the studs in each set form a ring possessing magnetic poles of opposite polarity at opposite axial ends.

Another object of this invention is the provision of magnetic apparatus in which cooperative magnetic means serve to support a subject in space and are operable to move the subject in predetermined fashion.

A further object of the invention may be the provision of magnetic apparatus of the present class wherein substantially invisible filament means is used for stabilizing the supported subject.

A still further object is the provision of magnetic apparatus of the present class in which an auxiliary magnetic means is employed for urging the magnetic means associated with the suspended subject laterally from the supporting magnetic field and flexible means is employed to counteract the force of such urge whereby the subject is forcibly held within the effective confines of said supporting magnetic field.

These and numerous other important objects, advantages and inherent functions of the invention will become apparent as the same is more fully understood from the following description, which, taken in connection with the accompanying drawings, discloses preferred embodiments of the invention.

Figure 1:
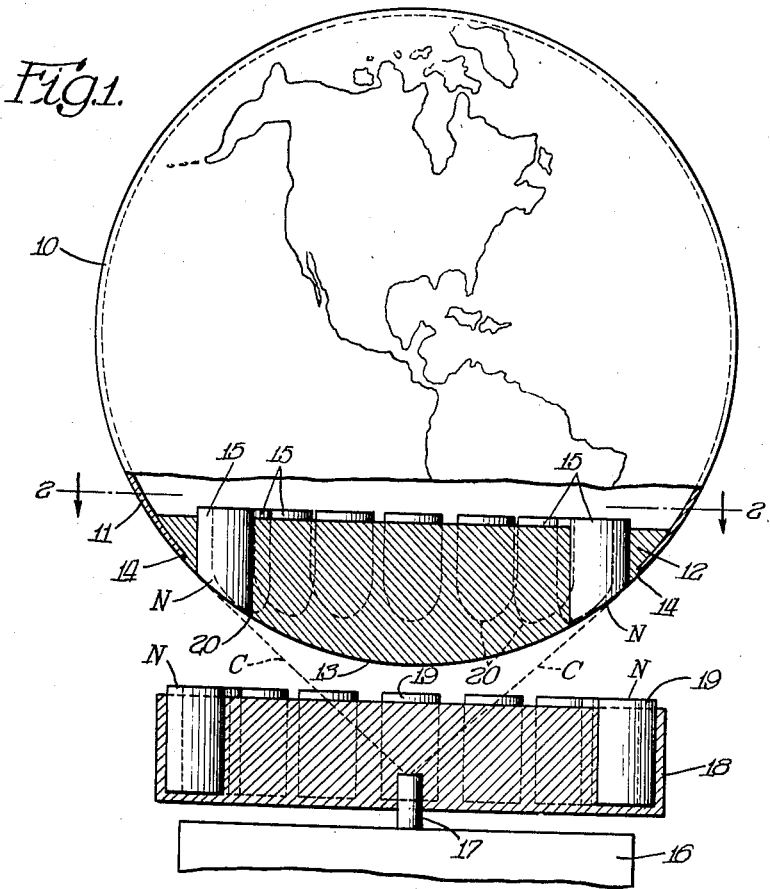
Fig. 1 is an elevational view, partly in section, illustrating a globe and magnetic operating means therefor constructed in accordance with the present invention.
Figure 2:
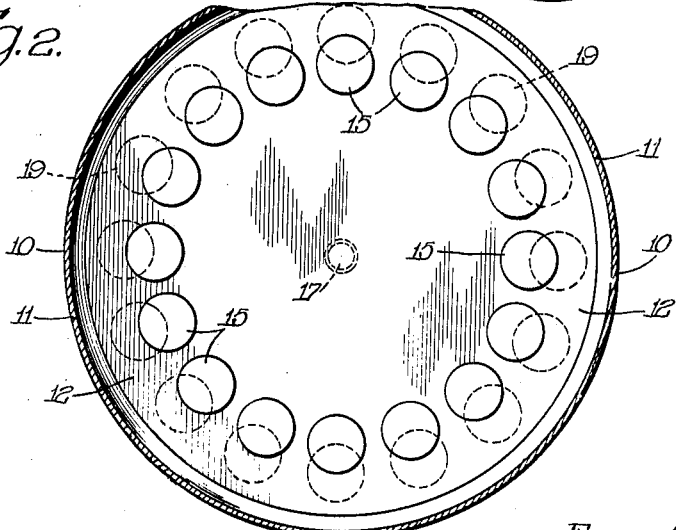
Fig. 2 is a horizontal sectional view directed downwardly at the line 2—2 of Fig. 1.

Referring now to Figs. 1 and 2, the apparatus there shown has a suspended subject in the form of a globe 10 such as that bearing a map of the world. Said globe comprises a thin spherical wall 11 and a spherical segment bottom member 12. The shell-like wall 11 provides the greater spherical surface portion of the globe 10 while the remainder is supplied by a spherical surface 13 of said bottom member 12, joining the lower circular edge 14 about an opening in the wall 11. Both the wall 11 and the bottom member 12 are preferably made of paper or other non-magnetic material that is light in weight. The bottom member 12 may be made of papier mâché.

A plurality of magnetized studs or bars 15 are arranged in a circle within a marginal edge section of the bottom member 12, such studs having their lower ends formed with diagonally disposed spherical surfaces struck with the same radius as the sphere 10 so they form a part of the surface 13. Since an entirely smooth surface is provided upon the globe 10 the map may be painted or printed directly thereon or attached thereto by the use of a plurality of adhesively applied strips collectively depicting the spherical map.

Below the globe 10 there is shown a box 16 or other suitable enclosure for a motor (not shown). A shaft 17 driven by said motor supports a horizontally arranged disk-like member 18 which has about the circumferential edge thereof a plurality of magnetized studs 19. The main body of the disk 18 may be made of wood, brass, papier mâché or other non-magnetic material in which the studs 19 can be embedded as shown. Said studs 19 are arranged in the disk 18 with their upper ends of the same polarity, such as the north pole N, and the studs 15 are also arranged with their lower ends all of the same polarity and of the same polarity as the upper ends of the studs 19. Since the studs 15 and 19 present poles of like polarity in opposed relation the resulting magnetic field between these two sets of studs will create a repelling force and when the magnetization of these studs is sufficient this force will be adequate for supporting the entire globe structure above the disk 18 in some such spaced relation as that illustrated in Fig. 1.

Because of the circular arrangement of the studs 19 the resulting magnetic field above the disk 18 will be cone-shaped, the greater intensity of this field being substantially directly above the studs 19, and since the studs 19 are arranged about a circle of greater diameter than that about which the studs 15 are arranged, as can be seen in Fig. 2, this inverted cone will be sufficiently large at its base or upper end to enclose the studs 15 and their respective magnetic field. Dotted lines C generally indicate the inner periphery of the aforesaid inverted magnetic field cone. The diameter of the magnetic field created at the lower ends of the studs 15 is somewhat decreased in diameter by the arrangement of the point-like ends 20 of these studs radially inwardly with respect to their circular formation, the greater portion of the magnetic flux lines extending from the lower ends of these studs in the vicinity of said point-like ends. It will be seen, therefore, that the inverted magnetic cone effected by the flux lines created by the composite arrangement of the studs 19 forms a seat somewhat embracing the magnetic field of like polarity extending downwardly and outwardly from the studs 15 whereby the support for the sphere 10 is stabilized. For instance, if the position of the sphere 10 should be disturbed by displacing it a short distance laterally in any direction, the poles 15 in the advance of such movement would be projected into greater repelling relation with the magnetic cone of the pole members 19 so that upon termination of the displacing force the globe 10 would be propelled backwardly to its original position. Likewise, should any force tend to rotate the globe as 10 about a horizontal axis the poles 15 upon the downwardly rotated section of said globe would be carried into greater repelling relation with the adjacent poles 19 in the disk 18, whereas the poles 15 upon the diametrically opposite and hence upwardly displaced portion of the globe would be carried into a position where less repelling force exists therebetween and the adjacent poles 19 so that upon removal or termination of such force the globe would be caused to rotate retrogressively to its initial position. Thus the coaxial arrangement of the sets of poles 15 and 19, with the set 19 arranged about a circle of greater diameter causes the sphere 10 to be supported in a stabilized condition.

It will be understood that by rotating the shaft 17 and the disk 18 by means of the aforesaid motor (or clockwork) concealed in the enclosure 16, the magnet field associated with the upper ends of the studs 19 will be rotated about a vertical axis and will thus act through the magnetic field associated with the lower ends of the stud 15 to cause said studs and the globe 10 with which they are physically connected to rotate in the same direction about a vertical axis. It is contemplated that the globe 10 can be controlled by clockwork causing one complete revolution of the disk 18 every 24 hours to cause similar rotation of the globe 10, whereby rotation of said globe will be synchronized with that of this planet.

Figure 3:
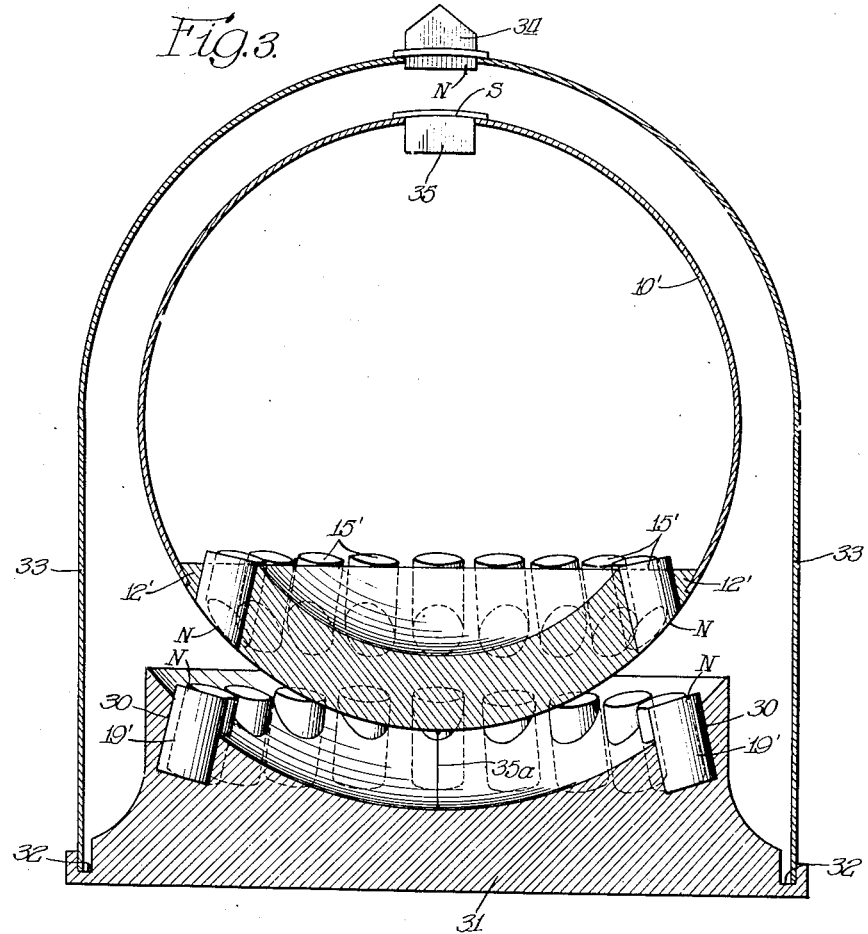
Fig. 3 is a view like Fig. 1 illustrating a modified form of embodiment.

In Fig. 3 there is shown a modified spherical body or globe 10' corresponding to the globe 10 in Figs. 1 and 2, a series of magnetized studs 15' corresponding to the studs 15 and a bottom member 12' corresponding to said bottom member 12 although the member 12' is dished upon its inner surface to minimize material and thus reduce its weight. A second circularly arranged series of studs 19' correspond to the studs 19. However, said studs 19' are set within recesses 30 within a fixed base member 31 which may be of wood or other non-magnetic material and which is provided with a concave upper face to enable the globe to extend downwardly thereinto whereby studs 15' and 19' of less magnetic strength may be used since the opposed ends of these sets of studs may then come closer together while still freely suspending the globe 10'. Said base member 31 has a circumferential groove 32 in which the lower end of a bell jar 33 or the like made of transparent material as glass or Cellophane may rest. Within the upper end of the enclosing member 33 there is a magnetic pole piece 34 disposed for close proximity and coaxial relation with a magnetic pole piece 35 carried in the upper side of the sphere 10'. The circularly arranged sets of magnets 15' and 19' cooperate for suspending the sphere 10' in space in the manner described in connection with the first embodiment while magnetic pole pieces 34 and 35 are so arranged that they present ends of opposite polarity in opposition whereby the pole member 34 attracts the pole member 35, thereby augmenting the upward thrust of the magnetic field associated with the studs 19' and opposing lateral movement of the member 35 whereby additional stabilization is rendered for the support of the sphere. Further stabilization is provided by a small substantially invisible filament 35a connected between the members 12' and 31. Since the wall of the bell jar 33 prevents air currents from reaching the sphere or globe 10' this member 33 affords a further source of stabilization while permitting an unobstructed view of the subject.

Figure 4:
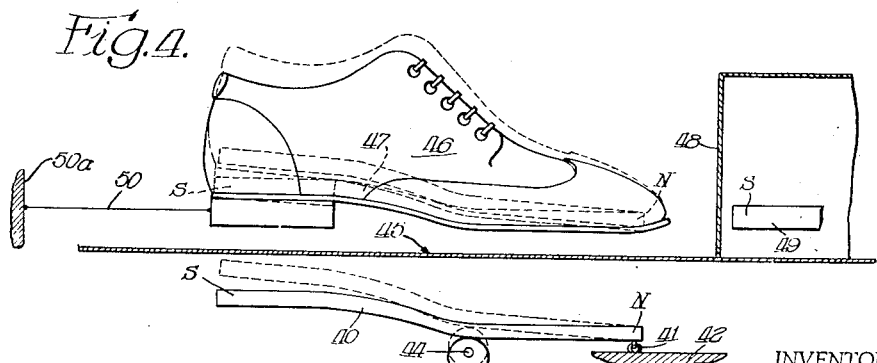
Fig. 4 is a modified form of apparatus embodying the invention and especially suited for advertising.

That form of the invention illustrated in Fig. 4 is for performing an animated display of merchandise or the like. While this apparatus may be employed for advertising various articles of merchandise, this particular setup is illustrated as it may be used in advertising shoes.

This apparatus comprises a magnetized bar 40 having associated with one end thereof some standard means as 41 pivotally connecting the same with a fixed support 42. The bar 40 is complementally supported upon a circular cam member 43 fixed to a rotatable shaft 44. A motor (not shown) may be employed for rotating the shaft 44 and hence the cam plate 43 may be rotated at any desired speed to cause oscillative movement of the bar 40 between oscillative limits coinciding with the positions in which this bar respectively appears in full and in dotted lines. The top 45 of concealing structure for the bar 40 and the supporting means therefore is interposed between said bar and the subject constituting the shoe 46. A second magnetic bar 47, is disposed within the shoe 46 in such a manner that the left end of the bar is of the same polarity as that of the bar 40 and likewise the right end of the bar is of the same polarity as the right end of the bar 40. Consequently, the magnetic fields associated with these two bars will cooperate in supporting the bar 47 above the bar 40, the magnetic force between the bars being sufficient to enable the bar 47 to support the shoe 46. A portion 48 of the concealing structure encloses and supports a magnetic bar 49 of which the left end is opposite in polarity to that of the right end of the bar 47 so that the bar 47 will be urged to the right by the magnetic field established between said bars 47 and 49. Such action of the magnetic field between the bars 47 and 49 cooperates with a strong thin substantially invisible filament 50 such as a black thread, secured at one end in a fixed support 50a, in maintaining the bar 47 over the bar 40. The aforesaid magnetic field between the bars 47 and 49 prevents the bar 47 from shifting to the right from the balanced position over the field between the bars 47 and 40 while the filament 50 prevents said bar 47 from sliding to the right or to the back or front with respect to the plane of the figure.

So long as the bar 40 remains stationary a state of equilibrium will exist between the forces acting between the bars 47 and 40 and the bars 47 and 49 and in the filament 50 so that the bar 47 and the displayed subject 46 carried thereby will remain stationary. However, by connecting the shaft 44 with the aforesaid motor to cause this shaft and the cam 43 to rotate slowly for oscillating the bar 40 about the pivot 41, the bar 47 can be made to oscillate for displacing the shoe 46 between the full line and dotted line positions, thus causing the shoe to effect motion simulating that incurred when worn by a person walking.

Figure 5:
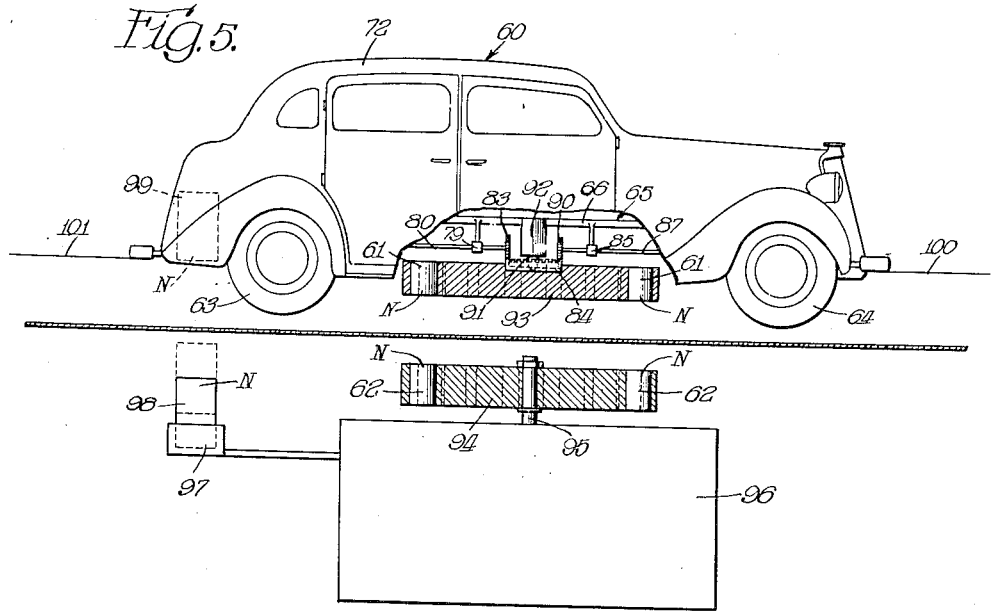
Fig. 5 is an elevational view illustrating a further modified arrangement of apparatus embodying the principles of the present invention.
Figure 6:
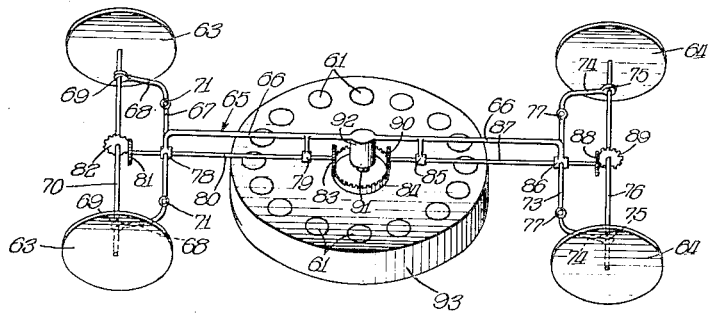
Fig. 6 is a perspective view illustrating the chassis and driving gear for the miniature vehicle shown in Fig. 5.

An additional form of the invention, shown in Figs. 5 and 6, includes a vehicle 60 supported by a magnetic field developed between sets of magnetic studs 61 and 62 and which are operated and controlled in such a manner as to cause vehicle wheels 63 and 64 to rotate. In Fig. 6 the frame 65 for the vehicle will be seen to comprise a longitudinal member 66 having at its back end a transverse member 67 from which there depend legs 68 in which there are bearings 69 for a rear axle 70 upon which the wheels 63 are fixed. Apertures 71 in the transverse frame member 67 are for receiving bolts (not shown) for attaching the vehicle body 72 to the frame 65. At the front end of the longitudinal frame member 66 there is a transverse frame member 73 having legs 74 in which there are bearings 75 in which a shaft 76 having the wheels 64 fixed thereto is journalled. Apertures 77 corresponding to the apertures 71 are also provided in the transverse frame member 73.

A pair of bearing members 78 and 79 depending from the frame member 66 rotatively carry a drive shaft 80 which carries on its back end a gear 81 which meshes with and drives a gear 82 fixed to the rear shaft 70. A gear 83 upon the front end of the shaft 80 meshes with gear teeth arranged circumferentially about the edge of the upper face of a gear plate 84. Another pair of bearings 85 and 86 depend from the front portion of the frame member 66 and carry a shaft 87 which in turn carries a pinion 88 for driving a gear 89 fixed to the front shaft 76. A gear 90 upon the back end of the shaft 87 meshes with the teeth upon the gear plate 84. The center of gear plate 84 is countersunk to form a bearing for a spindle 91 projecting downwardly from a stud 92 upon the frame member 66. That portion of the lower end face of the stud 92 immediately about the spindle 91 bears upon the upper face of the gear plate 84 to support thereon the frame 65 and the vehicle body 72. The gear plate 84 is fixed coaxially with and to a disk 93 of non-magnetic material which carries the circularly arranged magnetic studs 61. A second disk 94 carries the circularly arranged studs 62 in a circular formation of slightly greater diameter than the circular formation of the studs 61, the disk 94 likewise being of non-magnetic material. The disk 94 is supported upon a rotatable spindle 95 driven by a motor (not shown) within a box 96. Said motor also drives an arm 97 which carries a magnetic bar 98, the arm 97 being moved up and down for carrying the upper end of the bar 98 between the positions shown in full and dotted lines. A bar cooperative with the bar 98 and shown in dotted outline at 99 is carried in the back end of the vehicle body 72. The lower end of the bar 99 and the upper end of the bar 98 are of the same polarity so that the magnetic field created therebetween exerts an upward force upon the bar 99.

During operation of this apparatus the rotating disk 94 causes the magnetic field associated with the magnetic studs 62 to rotate and thereby cause rotation of the disk 93 which reacts upon the aforesaid rotating magnetic field through the magnetic field created by the magnetic studs 61. Rotation of the vehicle body is prevented by means of a plurality of guy filaments as 100 and 101 which maintain the vehicle and the disk 93, upon which the vehicle is journalled at the hub portion, in active alignment with the magnetic field of the studs 62. Since the vehicle body is held against rotation the disk 93 will rotate relatively thereto to cause the gear plate 84 to impart rotative movement to the gears 83 and 90 and thence to the shafts 80 and 87, the gears 81 and 88, the gears 82 and 89, the shafts 70 and 76 and the wheels 63 and 64. Simultaneously, as the arm 97 moves the magnet bar 98 upwardly and downwardly, the magnet bar 99 will be caused to move upwardly and downwardly whereby the vehicle will be given a rocking motion simulative of that incurred pursuant to traversing a rolling highway, although the vehicle will have the appearance of floating in space. Such rocking motion of the vehicle is facilitated by making the filaments 101 at the rear of the vehicle of an elastic material such as rubber, these filaments being of sufficient strength to preclude rotative movement of the vehicle yet sufficiently yieldable to permit up and down movement thereof.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the forms herein described being preferred embodiments for illustrating the invention.

The invention is hereby claimed as follows:

1. In a magnetic apparatus wherein a subject having magnetic means physically connected therewith is supported in space by a magnetic field acting upon said magnetic means, a base member from which said subject is to be so supported, a plurality of spaced apart magnetic pole pieces arranged in ring-like formation on said base member with pole portions of like polarity disposed upwardly and generally toward the space in which said subject is to be supported, said pole pieces providing a ring-like magnetic field extending in a generally vertical direction and adapted to react with a subject magnetic means to support a subject in spaced relation above the base.

2. In a magnetic apparatus for supporting a subject in space, magnetic means for physically supporting said subject and arranged with its principal axis extending vertically, and ring-like magnetic means arranged coaxially with and below the first magnetic means, the upper pole of said ring-like magnetic means and the lower pole of the first magnetic means being of the same polarity whereby the resulting magnetic field therebetween is effective to maintain said first means above said ring-like means, and said ring-like means exceeding said first means in diameter horizontally whereby an inverted conical magnetic field is formed of relatively great diameter with respect to the first means to render said resulting magnetic field correspondingly more stable in the support of the first magnetic means.

3. The combination set forth in claim 2 and wherein there is means for rotating the ring-like magnetic means to cause animation of the first magnetic means and of the subject.

4. A magnetic display apparatus comprising a display subject including magnetized means, additional magnetized means below the subject magnetized means and of a polarity to repel said subject magnetized means to thus support said subject in spaced relation with said additional magnetized means, and stabilizer means comprising further magnetized means for maintaining the subject magnetized means effectively in the field of said additional magnetized means.

5. A magnetic display apparatus comprising a display subject having upper and lower magnetized means, and additional magnetized means located respectively above and below the upper and lower subject magnetized means, the lower magnetized means and the additional magnetized means therebelow being disposed with like polarity poles in opposed relation whereby said lower of the subject magnetized means is repelled with sufficient force to suspend the same and the subject in space, and the upper magnetized means and the additional magnetized means thereabove being disposed with dissimilar poles in opposed relation whereby an attraction exists therebetween to preclude tilting of the subject.

6. A magnetic display apparatus comprising a display subject including magnetized means, additional magnetized means arranged below the subject magnetized means and of a polarity to repel the subject magnetized means to thus support said subject in spaced relation with respect to said additional magnetized means, and stabilizer means for maintaining said subject effectively in the field of said additional magnetized means comprising further magnetized means positioned laterally of said subject magnetized means for creating a magnetic force reacting upon the subject means to urge it laterally of said field, and a filament member connected with the subject to exert thereon a force in opposition to said magnetic force.

7. In a magnetic apparatus, supporting magnetic means, supported magnetic means disposed in the magnetic field of said supporting magnetic means and of a polarity to be suspended in space thereby, and means for maintaining said supported means in said field comprising further magnetic means positioned laterally of said supported magnetic means for creating a magnetic force reacting upon the supported means to urge it laterally of said field, and a filament member connected with said supported means to exert thereon a force generally opposite to and cooperable with said magnetic force to create a resultant force opposing lateral displacement of the supported means by any collateral force.

8. The combination set forth in claim 7, and wherein there is means for tilting said supporting magnetic means whereby the magnetic field thereof is shifted to also effect tilting of the supported magnetic means.

9. In a magnetic apparatus, a supporting magnetic bar, a magnetic bar adapted to be supported disposed above said supporting bar and with its end portions in substantial vertical alignment respectively with the end portions of the same polarity upon the supporting bar whereby the second named bar is suspended in the field of the supporting bar, further magnetic means cooperating with filament means connected with said second named bar to maintain the second named bar in said field of suspension, and means for tilting said supporting bar to cause displacement of said field and corresponding tilting of the second named bar.

10. In a magnetic apparatus, a supporting magnetic bar, pivot means supporting said bar for oscillative movement about a horizontal axis, a magnetic bar adapted to be supported disposed above said first member magnetic bar and with its end portions in substantial vertical alignment respectively with the end portions of the same polarity upon the supporting bar whereby the second named bar is suspended in the field of the supporting bar, filament means connected with said second named bar to prevent horizontal displacement thereof from said field, and means for oscillating said supporting bar to cause corresponding oscillation of the second named bar.

11. In a magnetic display apparatus, a disk-like member disposed in a horizontal plane, a plurality of annularly spaced apart magnetic pole piece means arranged upon and about said disk, a miniature vehicle mounted upon said disk in a manner permitting of relative rotative movement of the disk-like member, road wheels on said vehicle, a second plurality of annularly spaced apart magnetic pole piece means mounted coaxially of and below the first magnetic means and having a magnetic field repelling the first magnetic means with sufficient force to support the same and said vehicle thereon in space, means for rotating the second magnetic means to cause rotation of said first magnetic means and its associated disk about a vertical axis, substantially invisible means connected with said vehicle to prevent rotation thereof with said disk, and drive means for said vehicle wheels, said drive means being supported upon said vehicle and operable by said disk when the latter is rotated relatively to said vehicle.

12. The combination set forth in claim 11, and wherein there is a magnetic member in said vehicle, a magnetic member adapted to be displaced, said second named magnetic member being positioned exteriorly of said vehicle and having a magnetic field in force transmitting relation with respect to the first magnetic member, and means for displacing the second member to cause displacement of the first member to impart rocking motion to the vehicle.

13. A magnetic apparatus comprising a subject having magnetic means physically connected therewith, and generally ring-shaped magnetic pole piece means having a cone-like field acting upon said first magnetic means to thereby support said subject in space, said magnetic pole piece means including a plurality of spaced apart permanent magnets.

14. Magnetic apparatus comprising a magnetized member, a second magnetized member disposed within the magnetic field of said first named member and of a polarity to be repelled by the first named member, a third magnetized member arranged laterally of said second member and of a polarity to attract the second member and urge it laterally of the field between the first named and second members, and flexible means connected to said second member and to a relatively fixed support and opposing movement of the second member under attraction of said third member to maintain the second member in said field, the forces of repulsion and attraction between said magnetized members in cooperation with said flexible means operating to cause said second member to be suspended in space.

15. Magnetic apparatus comprising a magnetized member, a second magnetized member arranged above said first named member and disposed within the magnetic field of said first named member, said second member being of a polarity to be repelled by the first named member, a third magnetized member arranged laterally of said second member and of a polarity to attract the second member and urge it laterally of the field between the first named and second members, and flexible means connected to said second member and to a relatively fixed support and opposing movement of the second member under attraction of said third member to maintain the second member in said field, the forces of repulsion and attraction between said magnetized members in cooperation with said flexible means operating to cause said second member to be suspended in space above said first named member.

16. Magnetic apparatus comprising an elongated magnetized bar having unlike poles at opposite ends, a second magnetized bar extending substantially parallel with said first named bar and having unlike poles arranged to be repelled by the poles of said first named bar, a third magnetized member arranged at one end of said second magnetized bar and of a polarity to attract the second bar and urge it towards said third member, and flexible means connected to said second bar and to a relatively fixed support and opposing movement of the second bar under attraction of said third member to maintain the second bar within the repelling field of said first named bar, the forces of repulsion and attraction between said magnetized bars and said third member in cooperation with said flexible means operating to cause said second bar to be suspended in space.

17. Magnetic apparatus comprising an elongated magnetized bar having unlike poles at opposite ends, a second magnetized bar extending substantially parallel with said first named bar and having unlike poles arranged to be repelled by the poles of said first named bar, a third magnetized member arranged at one end of said second magnetized bar and of a polarity to attract the second bar and urge it towards said third member, and flexible means connected to said second bar and to a relatively fixed support and opposing movement of the second bar under attraction of said third member to maintain the second bar within the repelling field of said first named bar, the forces of repulsion and attraction between said magnetized bars and said third member in cooperation with said flexible means operating to cause said second bar to be suspended in space, and said magnetized bars and said third magnetized member each comprising a permanent magnet.

18. Magnetic apparatus comprising mutually repellent magnetic means for supporting one member in spaced relation with respect to another member, and means comprising a further magnetic means and a flexible member for maintaining said first named members in magnetically repelled spaced relationship.

19. Magnetic apparatus comprising mutually repellent magnetic means for supporting one member in spaced relation with respect to another member, means for maintaining said members in magnetically repelled relationship with said first named member suspended in space with respect to said second named member, additional magnetic means cooperating with said first named member for effecting movement of the first named member in response to movement of said additional magnetic means, and means for causing predetermined movement of said additional magnetic means to effect predetermined movement of said first named suspended member.

ERNEST C. NEAL.